3,377,372
METHOD FOR PREPARING ESTERS OF
HYDROXYAROMATIC THIOACIDS
Gilbert H. Berezin, Newark, Del., and Guy H. Harris, Concord, Calif., assignors to The Dow Chemical Company, Midland, Mich., a corporation of Delaware
No Drawing. Continuation-in-part of application Ser. No. 342,281, Feb. 3, 1964. This application June 16, 1967, Ser. No. 646,503
11 Claims. (Cl. 260—455)

ABSTRACT OF THE DISCLOSURE

The method for preparing esters of aromatic, thioacids by the rearrangement of the corresponding aryl ester of S-alkyl thio-carbonic acid.

Cross reference to related applications

This application is a continuation-in-part of our earlier filed application Ser. No. 342,281, entitled, "Esters of Hydroxy-Aromatic Thioacids," filed Feb. 3, 1964, our U.S. Patent No. 3,338,947; which is in turn a continuation-in-part of our Ser. No. 140,998, filed Sept. 27, 1961, entitled, "Esters of Hydroxy-Aromatic Thioacids," now abandoned.

Summary of invention

In accordance with the present invention, an aryl ester of S-alkyl thio-carbonic acid is heated in the presence of a Friedel-Crafts catalyst until evolution of HCl ceases. The result of such operation is the rearrangement of the ester to form the hydroxyaryl thioate. The reaction conveniently can be illustrated by the following equation:

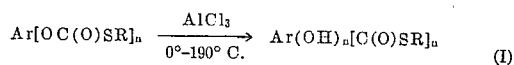

(I)

wherein R represents a primary aliphatic radical having from 1 to 18 carbon atoms or aryl, $n$ represents an integer from 1 to 2, Ar represents an aromatic nucleus. The preparation of the ester which can be rearranged follows the general equation:

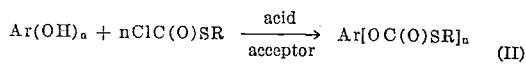

(II)

The symbols Ar, $n$ and R have the aforesaid significance. The compounds (I) are useful for the control and eradication of undesirable vegetation. Further, some of these compounds have utility as fungicides. The hydroxy compound employed to prepare the ester in accordance with Equation II can be substantially any aromatic hydroxy compound which has an ortho or para position free from substituents and which contains no substituent reactive under the condition of reaction other than aromatic hydroxyl, nor nitro, cyano, or other strongly deactivating group. Thus, the aromatic nucleus is derived from a hydroxyaromatic compound of the benzene series or naphthalene series, a diphenol or alkylene bisphenols (hereinafter referred to as phenols), having at least one position ortho or para to the hydroxyl free of substitution. It is to be understood that the aromatic nucleus can be substituted with halogen, alkoxy, alkyl and other substituents not reactive under the conditions of reaction. Some of such compounds useful in accordance with the present invention providing the aromatic nucleus are the phenols, i.e., the cresols, the methoxyphenols, the mono- and polyalkylphenols, the phenylphenols, the alkylidene bisphenols, the diphenols and the resorcinols and the like as well as their alkyl-, alkoxy- and halo-substituted derivatives. Exemplary of the above classes are phenol, o-, m-, or p-cresol, 3,5- 3,4-, 2,4-, 2,3- or 4,5-dialkylphenols, diphenol, o-, p- or m-alkoxyphenol, p-chlorophenol, 2-chloro-4-methylphenol, naphthol, 2,2'-isopropylidenebisphenol, methylenebisphenol, resorcinol and the like.

The thiochloroformates which can be employed to prepare the esters in accordance with the Equation II are those having the formula

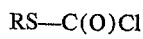

wherein R represents a saturated primary aliphatic hydrocarbon radical having from 1 to 18 carbon atoms, aryl, or alkylaryl or their halogenated derivatives. Some of such compounds which can be employed are methyl, ethyl, propyl, butyl, pentyl, hexyl, heptyl, octyl, nonyl, decyl, undecyl, dodecyl, tridecyl, tetradecyl, pentadecyl, hexadecyl, heptadecyl and octadecyl thiochloroformate and all of their primary isomers and halogenated derivatives, as well as phenyl, alkylphenyl, halophenyl, alkylhalophenyl thiochloroformates and the like.

The reaction conditions for carrying out the thiol ester formation are:

Temperature: 0° to about 180° C. and preferably about room temperature.

Time: The length of time of reaction is not critical, some of the desired ester being produced in several minutes. However, at room temperature, most esterifications require from several minutes to several hours or even several days when operating at 0° C.

Solvents: When the organic bases are employed as hydrogen chloride acceptors no solvent is usually necessary. However, in some instances, an inert solvent facilitates the reaction. When the inorganic bases are employed as hydrogen chloride acceptors, it is advantageous to employ them in aqueous solution. Thus water becomes the reaction solvent.

Hydrogen chloride acceptors: Substantially any organic or inorganic base can be employed as a hydrogen chloride acceptor. Preferably, however, the tertiary amines and alkali metal hydroxides are employed because of ready, inexpensive availability, ease of handling and, in the case of the organic tertiary amines, ease of recovery and regeneration. Thus one can employ the tertiary amines such as pyridine, trimethylamine, triethylamine, the alkali metal hydroxides such as sodium hydroxide, potassium hydroxide and the like.

The reaction conditions for carrying out the rearrangement reaction of the present invention are:

Temperature: 0° to about 180° C. Above about 180° C. side reactions occur which reduce the yield of desired product. Heating should be discontinued upon cessation of evolution of HCl.

Time: The length of time of reaction is not critical, some of the desired product being produced even with relatively short periods of reaction. The reaction usually is carried out until the evolution of HCl ceases. The reaction continues for about 15–30 minutes at the higher end of the temperatures, two to four hours at the intermediate temperatures and for from one to several days when operating at the lower end of the temperature range.

Solvent: Substantially any inert organic solvent can be employed. Thus one can employ carbon disulfide, the halogenated saturated aliphatic hydrocarbons such as tetrachloroethane, the substituted benzenes such as nitrobenzene, the halogenated benzenes, such as dichlorobenzene, and the like.

Catalyst: Any Friedel-Crafts catalyst can be employed. Representative of such are $AlCl_3$, $SnCl_4$, $TiCl_4$, $BF_3$, $ZnCl_2$, $ZnBr_2$, $AlBr_3$, $SnBr_4$, $TiBr_4$ and the like. The amount of catalyst is not critical. However, best results are obtained when the catalyst is employed in about equimolar proportions.

DESCRIPTION OF PREFERRED EMBODIMENTS

One manner of preparation of the starting thiocarbonic acid ester is hereinafter set forth:

GENERAL PREPARATION (ESTER)

The phenol (hydroxyaromatic nucleus) is reacted with the thiochloroformate in the presence of an HCl acceptor such as pyridine, the alkali metal hydroxides such as sodium hydroxide, and the like, the latter as aqueous solutions, at about room temperature unless otherwise indicated. Upon completion of the reaction the desired product is recovered by distillation under reduced pressure. The reactants, conditions of reaction and products are set forth below:

$$Ar(OH)_n + nClC(O)SR \longrightarrow Ar[OC(O)S]_n$$

| Example No. | Hydroxyl Reactant | HCl Acceptor or Base | R | Product | (M.P.) or B.P., °C./mm. | Percent Yield [1,2] |
|---|---|---|---|---|---|---|
| 1 | phenol (OH) | $C_5H_5N$ | Me | phenyl O-C(O)-SCH₃ | 80–85°/0.8 | 88 |
| 2 | p-Cl-phenol | $C_5H_5N$ | Me | p-Cl-phenyl O-C(O)-SCH₃ | 140°/15 | |
| 3 | p-CH₃-phenol | $C_5H_5N$ | Me | p-CH₃-phenyl O-C(O)-SCH₃ | 135°/15 | |
| 4 | o-CH₃-phenol | $C_5H_5N$ | Me | o-CH₃-phenyl O-C(O)-SCH₃ | 115°–117°/1–2 | 78 |
| 5 | p-CH₃-phenol | $C_5H_5N$ | $nC_{12}H_{25}$ | p-CH₃-phenyl O-C(O)-S-$C_{12}H_{25}$ | | |
| 6 | HO-C₆H₄-C₆H₄-OH | $C_5H_5N$ | $nC_{12}H_{25}$ | [-C₆H₄-O-C(O)-S-$C_{12}H_{25}$]₂ | (45–47°) | |
| 7 | 1-naphthol | $C_5H_5N$ | Me | 1-naphthyl O-C(O)-SCH₃ | 161°/0.25 | 77 |
| 8 | p-Cl-phenol | $NaOH$ [3] | $p\text{-}ClC_6H_4$ | (p-Cl-C₆H₄-O)-C(O)-S-(C₆H₄-Cl-p) | (94–96°) | 72.6 |

$$Ar(OH)_n + nClC(O)SR \longrightarrow Ar[OC(O)S_n]$$

| Example No. | Hydroxyl Reactant | HCl Acceptor or Base | R | Product | (M.P.) or B.P., °C./mm. | Percent Yield [1][2] |
|---|---|---|---|---|---|---|
| 9 | 2,6-dimethylphenol | $C_5H_5N$, 0° C. | Me | methyl 2,6-dimethylphenyl thiocarbonate | 107–8°/0.8 | |
| 10 | resorcinol | $C_5H_5N$ | Me | bis(methylthiocarbonate) of resorcinol | | 87.4 |
| 11 | m-cresol | $C_5H_5N$ | Me | methyl m-tolyl thiocarbonate | 86–93°/0.4 | 80 |
| 12 | m-methoxyphenol | $C_5H_5N$ | Me | methyl m-methoxyphenyl thiocarbonate | 112–115°/0.3 | |

[1] Based on thiochloroformate feed.
[2] Yields reported are for purified materials.
[3] Aqueous.

GENERAL PROCEDURE (REARRANGEMENT)

The thio-carbonic ester of the phenol obtained by reaction above outlined is mixed with an equimolar proportion of a Friedel-Crafts catalyst ($AlCl_3$ was used in the examples) and preferably with an inert solvent (ortho-dichlorobenzene has been employed in the examples). The resulting slurry is heated at from about 20° to 180° C. until the evolution of HCl ceases. Any solid formed during the reaction is removed by filtration and the desired product recovered from the filtrate by extraction with an ether-hexane extractant. The extractant is removed by distillation to yield the desired hydroxyarylcarboxylic ester. The products obtained and the reaction conditions employed are set forth in the following table:

| Ex. No. | Reactant | Temp., °C. | Method of Purification | Product | B.P., °C. (M.P.) | Yield [1][2] |
|---|---|---|---|---|---|---|
| 13 | phenyl methyl thiocarbonate | 140–150 | Steam Distilled | 2-hydroxyphenyl methyl thioester | 95–100 (2 mm.) | 26 |
| | | | Recrystallized Isooctane | 4-hydroxyphenyl methyl thioester | (120–122) | 16 |
| 14 | 4-chlorophenyl methyl thiocarbonate | 120 | Recrystallized Methanol | 2-hydroxy-5-chlorophenyl methyl thioester | (77–79) | 50 |

| Ex. No. | Reactant | Temp., °C. | Method of Purification | Product | B.P., °C. (M.P.) | Yield [1,2] |
|---|---|---|---|---|---|---|
| 15 | [4-methylcyclohexyl O-C(=O)-SCH₃] | 120-130 | Distilled | [2-hydroxy-5-methylcyclohexyl C(=O)-SCH₃] | 125-130 (3 mm.) | 50 |
| 16 | [2-methylcyclohexyl O-C(=O)-SCH₃] | 160 | Steam Distilled | [2-hydroxy-3-methylcyclohexyl C(=O)-SCH₃] | | 25 |
| | | | | [3-methyl-cyclohexyl with OH and CH₃S-C=O] | (85-90) | 14 |
| 17 | [CH₃S-C(=O)-O-cyclohexyl]₂ | 120-140 | Recrystallized from acetic acid | [CH₃S-C(=O)-, HO-cyclohexyl-]₂ | (85-88) | 20 |
| 18 | [decalinyl O-C(=O)-SCH₃] | 120 | Distilled | [decalinyl-OH, C(=O)-SCH₃] | | 18 |
| 19 | [3,5-dimethylcyclohexyl O-C(=O)-SCH₃] | [3] 95 | Recrystallized Methanol | [2-hydroxy-3,5-dimethylcyclohexyl C(=O)-SCH₃] | (61-65) | 60 |
| 20 | [cyclohexyl with two O-C(=O)-SCH₃] | 150 | do | [cyclohexyl with OH, C(=O)-SCH₃, OH, CH₃S-C=O] | | |
| 21 | [3-methylcyclohexyl O-C(=O)-SCH₃] | 165 | Steam Distillation | [2-hydroxy-3-methylcyclohexyl C(=O)-SCH₃] | (69-71) | 50 |
| 22 | [4-methoxycyclohexyl O-C(=O)-SCH₃] | 95 | Distilled | [2-hydroxy-4-methoxycyclohexyl C(=O)-SCH₃] | 140-145 | 20 |
| 23 | [4-methylcyclohexyl O-C(=O)-SC₁₂H₂₅] | 3 | do | [2-hydroxy-5-methylcyclohexyl C(=O)-SC₁₂H₂₅] | 224/3.5 | |

[1] Based on thiochloroformate feed.
[2] Yields reported are for purified materials.
[3] 14 hrs.

EXAMPLE 24

To illustrate the usefulness of the compounds having the generic Formula I as a herbicide, tests were carried out to determine the effectiveness of the named compounds as inhibitors to control the marigold.

The test compound was dispersed in water to prepare an aqueous composition containing 100 parts by weight of the compound per million parts by weight of ultimate mixture. This composition was employed for the treatment of seed germination beds which had been prepared and planted with the seeds of marigold. In the treating operations, the composition was applied to the seed beds as a drench and at a dosage of about 0.23 acre inch of aqueous composition per acre. Other seed beds similarly prepared and planted were left untreated to serve as checks.

After about eleven days, the seed beds were examined to ascertain what control of the growth and germination of seeds had been obtained. The results are set forth in the following table.

| Ex. No. | Test Compound | Percent Kill of Marigold Seeds and Seedlings |
|---|---|---|
| 24 | Salicylic acid/thiol, methyl ester | 100 |
| 25 | 2,3-cresotic acid/thiol, methyl ester | 100 |
| 26 | 2,5-cresotic acid/thiol, methyl ester | 100 |

In other tests, some of the compounds were found effective in the control of the Marine Borer Limnoria, others as aquatic herbicides and the like.

We claim:

1. A method which comprises contacting a compound having the following formula

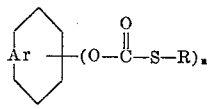

wherein $n$ represents an integer of from 1 to 2, R represents a radical selected from the group consisting of saturated primary aliphatic hydrocarbon radicals having from 1 to 18 carbon atoms, phenyl, alkylphenyl, halophenyl and alkylhalophenyl and wherein

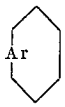

represents a member selected from the group consisting of phenyl, hydroxyphenyl, methylphenyl, dialkylphenyl, alkoxyphenyl, halophenyl, biphenylylene, naphthyl and biphenyl with a Friedel-Crafts metal halide catalyst at from 0° to about 180° C. in the presence of an inert organic solvent until evolution of HCl has substantially ceased, thereby to rearrange said compound to a product comprising at least one of the compounds represented by the configuration

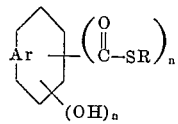

wherein each OH is ortho or para to a

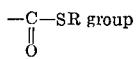 group

2. The method of claim 1 wherein said starting compound is

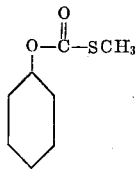

3. The method of claim 1 wherein said starting compound is

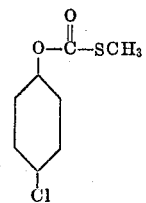

4. The method of claim 1 wherein said starting compound is

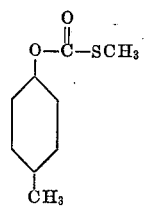

5. The method of claim 1 wherein said starting compound is

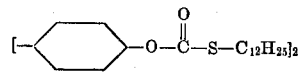

6. The method of claim 1 wherein said starting compound is

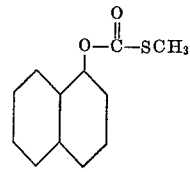

7. The method of claim 1 wherein said starting compound is

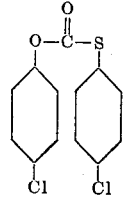

8. The method of claim 1 wherein said starting compound is

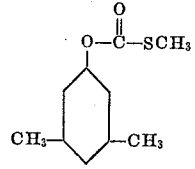

9. The method of claim 1 wherein said starting compound is
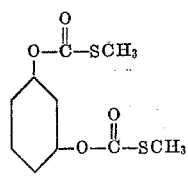
10. The method of claim 1 wherein said starting compound is
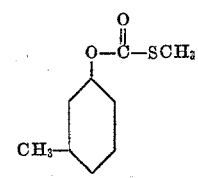
11. The method of claim 1 wherein said starting compound is
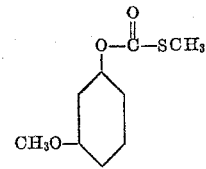
References Cited
UNITED STATES PATENTS
Miyaki et al.: "J. Pharm. Soc." (Japan), vol. 76, pp. 436–440, (1956).
CHARLES B. PARKER, *Primary Examiner.*
D. R. PHILLIPS, *Assistant Examiner.*